G. M. MILNE.
GEAR SHIFTER FOR CHANGE SPEED GEARING.
APPLICATION FILED FEB. 23, 1916.
1,318,167.
Patented Oct. 7, 1919.
4 SHEETS—SHEET 1.
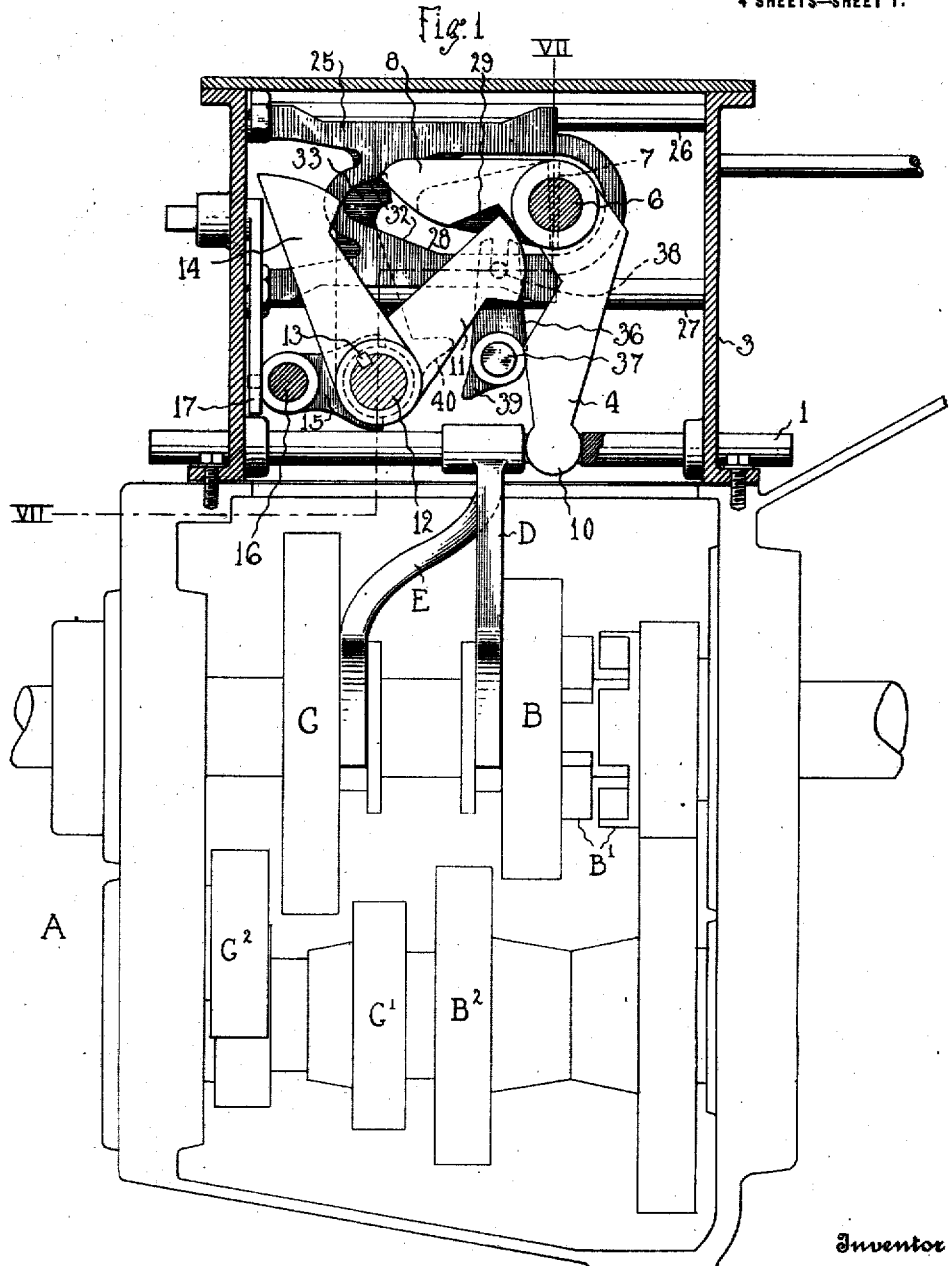

G. M. MILNE.
GEAR SHIFTER FOR CHANGE SPEED GEARING.
APPLICATION FILED FEB. 23, 1916.
1,318,167.
Patented Oct. 7, 1919.
4 SHEETS—SHEET 2.
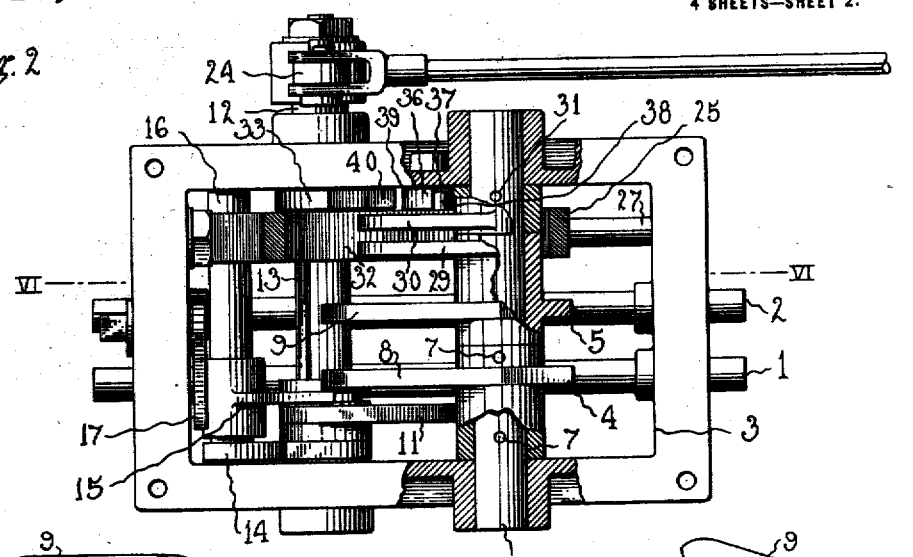
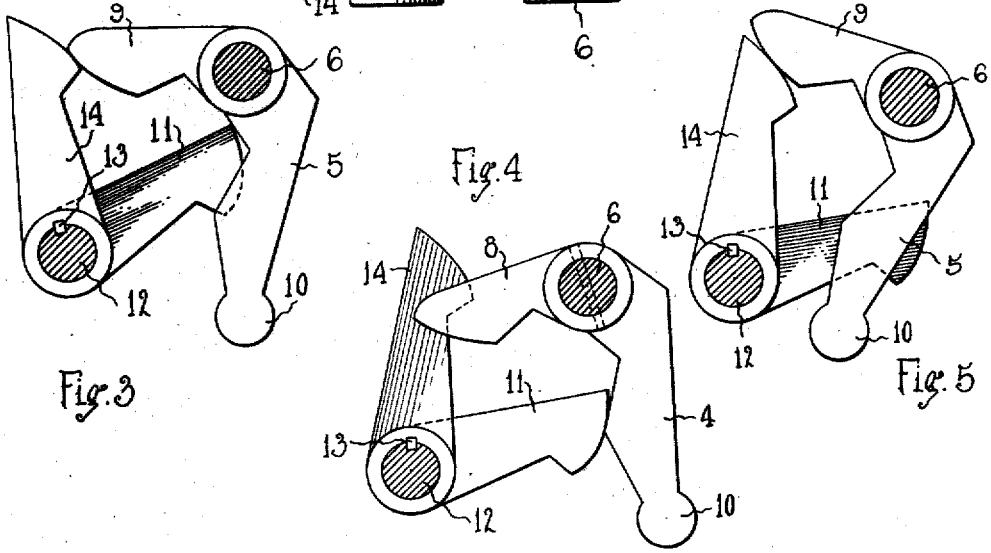
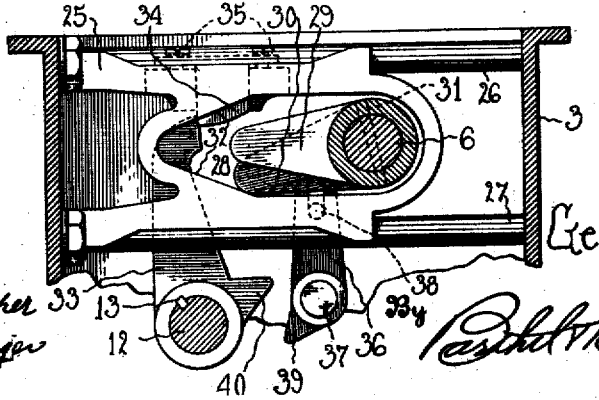
Inventor
George M. Milne

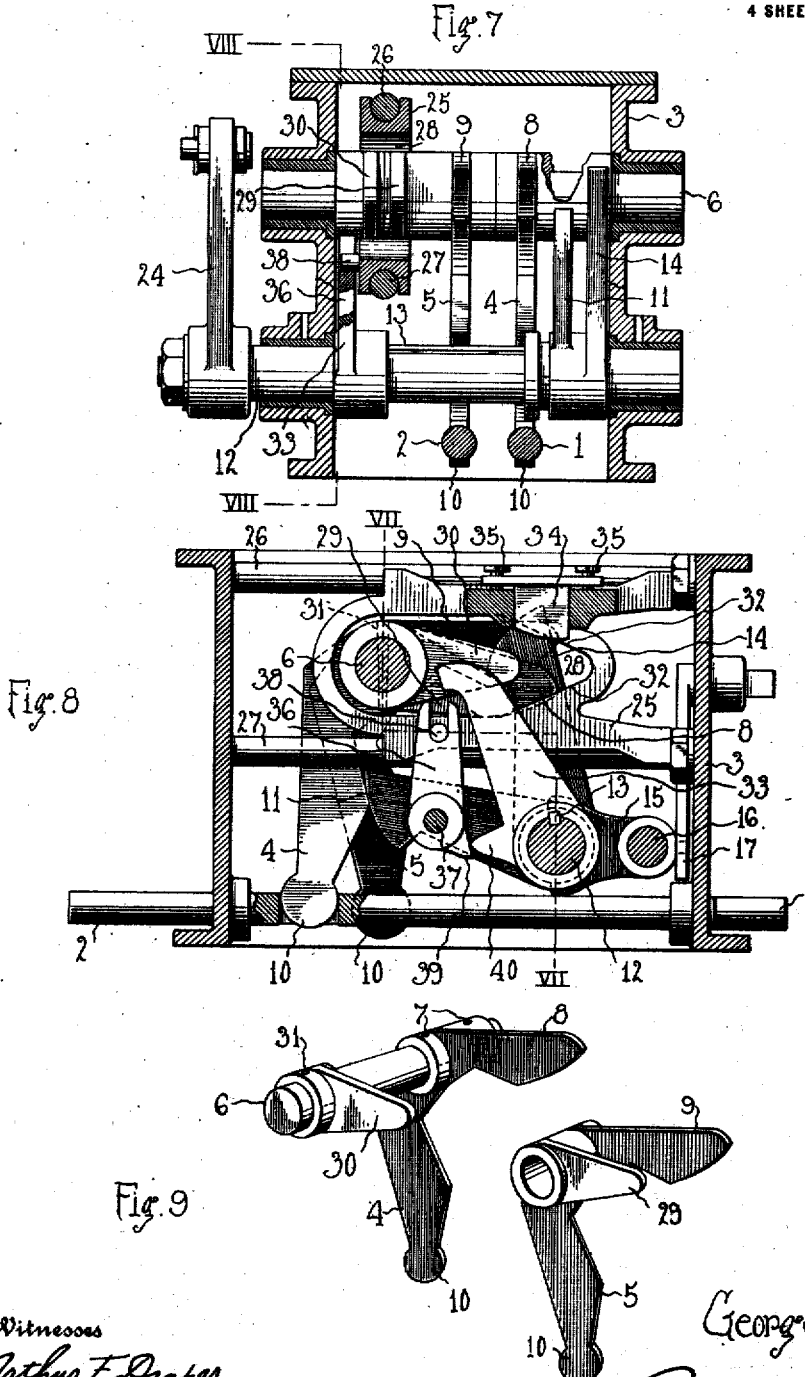

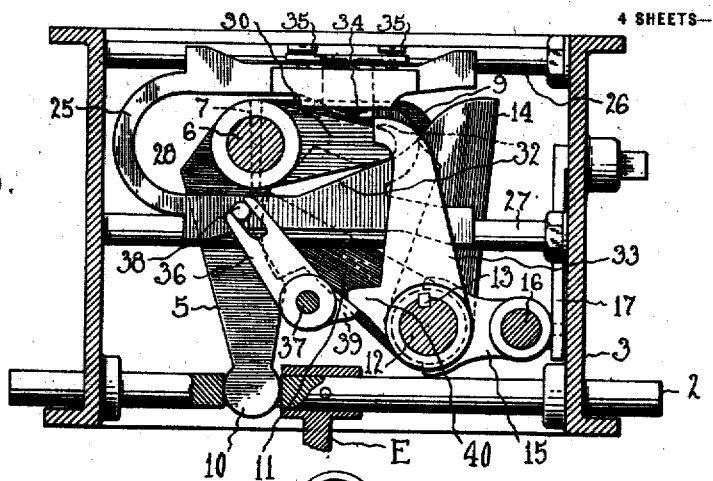
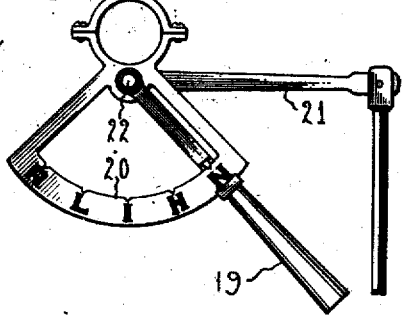
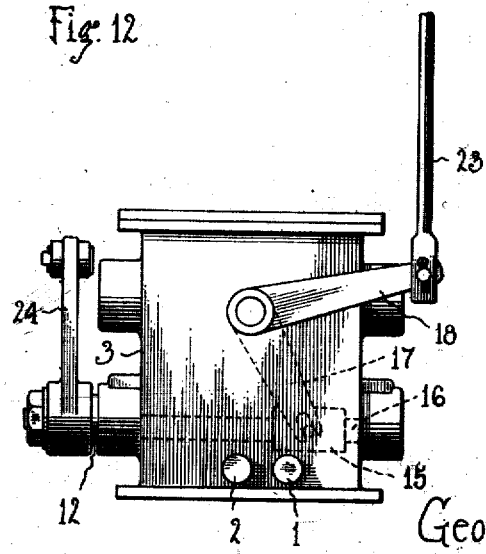

UNITED STATES PATENT OFFICE.

GEORGE M. MILNE, OF DETROIT, MICHIGAN.

GEAR-SHIFTER FOR CHANGE-SPEED GEARING.

1,318,167.  Specification of Letters Patent.  Patented Oct. 7, 1919.

Application filed February 23, 1916. Serial No. 79,927.

*To all whom it may concern:*

Be it known that I, GEORGE M. MILNE, a citizen of the United States of America, residing at Detroit, in the county of Wayne and State of Michigan, have invented certain new and useful Improvements in Gear-Shifters for Change-Speed Gearing, of which the following is a specification, reference being had therein to the accompanying drawings.

This invention relates to devices for shifting the gears of a change-speed power transmitting mechanism particularly adapted for use in motor vehicle constructions, and its object is to provide a simple, compact and efficient device for the purpose which may be readily applied to power transmissions as commonly constructed and embodied in automobiles and which is adapted to be mechanically operated and the speed changes effected by simple selector mechanism readily set by the driver. A further object of the invention is to provide a construction wherein the shifting of the change speed gears is directly under the control of the operator and all gears are automatically first shifted to neutral or inoperative position in effecting a change of speed. It is also an object of the invention to provide a construction which is such as to insure accuracy and positiveness of operation and which is strong and durable, yet comparatively inexpensive to construct and not liable to get out of order.

With these and other objects in view the invention consists in the construction, arrangement and combination of elements or their equivalents, an example of which is illustrated in the accompanying drawing and described in the following specification, reference being had to said drawings in which Figure 1 is a longitudinal vertical section through gear shifting mechanism embodying the invention and showing the same as applied to a change-speed mechanism whch is illustrated diagrammatically;

Fig. 2 is a plan view of the same with parts broken away and in section;

Figs. 3, 4 and 5 are detail views of gear shifting levers;

Fig. 6 is a sectional detail of a neutralizing slide and operating levers, substantially upon the line VI—VI of Fig. 2;

Fig. 7 is a transverse vertical section substantially upon the line VII—VII of Figs. 1 and 8;

Fig. 8 is a longitudinal vertical section on the line VIII—VIII of Fig. 7;

Fig. 9 is a perspective detail of gear shifting levers detached;

Fig. 10 is a longitudinal section similar to that of Fig. 8 showing the parts in a different position;

Fig. 11 is a plan view of a selecting lever and its indicating sector; and

Fig. 12 is an end elevation of the shifting mechanism casing drawn to a smaller scale.

As illustrated in Fig. 1, A indicates the casing of a common construction and arrangement of sliding gear change-speed power transmitting mechanism used in automobile construction in which sliding gears B and C are shiftable longitudinally on their shaft into mesh with other gears on a counter shaft in the casing to give the desired speed changes. These gears are arranged in the usual manner so that a forward movement of the gear B brings clutch members B' into mesh to directly connect the driving and driven shafts and give high speed, and a rearward movement of said gear brings it into mesh with a similar gear B2 on the counter shaft to give an intermediate or second speed. A forward movement of the gear C which is of larger diameter than the gear B, brings said gear C into mesh with a smaller gear C' on the counter shaft to give first or low speed and a rearward movement of the gear C brings it into mesh with an intermediate or reversing gear C2, to impart a reverse motion to the driven shaft. This simple form of gearing is shown in the drawings to illustrate the operation of the gear shifting mechanism embodying the invention but it will be understood that other forms or arrangements of change speed gearing may be employed.

The shifting of the gears B and C is directly effected in the usual manner by means of yokes D and E secured to shifting rods 1 and 2 which may be located as in the usual construction of change speed gearing within the casing A or as shown in the drawings they may be mounted in bearings in the ends of a suitable casing 3 for the gear shifting mechanism embodying the invention, which casing is preferably secured upon the top of the casing A over the usual opening therein.

Longitudinal movement is imparted to the rods 1 and 2 by means of shifting levers or arms 4 and 5 mounted upon a shaft 6 which extends transversely of the casing 3 and is mounted in bearings in the sides thereof. The arm or lever 4 is secured in any suitable manner as by a pin 7 to the shaft 6 as is also a laterally and rearwardly extending arm or lever 8 which is arranged to turn simultaneously with the arm 4 and extends substantially at right angles thereto. The arm 5 is mounted upon the shaft 6 to turn freely thereon and formed integral with its hub or secured thereto is a laterally and rearwardly extending arm 9 corresponding to the arm 8. The arms 4 and 8 lie in the same vertical longitudinal plane, as do also the arms 5 and 9, and each of the downwardly extending arms 4 and 5 has a circular shaped lower end 10 to engage a slot or opening in the shifting rod which is operated thereby or said arms may be in any other suitable manner pivotally connected to the rods.

The rear edge of each of the arms 4 and 5 is provided with a suitable contact surface adapted to be engaged by a suitable cam lever 11 having a rounded or curved end surface to engage the contact surfaces of the arms. This cam lever is mounted upon a transverse shaft 12 in the casing 3 and is operatively secured thereto to turn therewith by means of a spline 13 but is free to slide longitudinally of the shaft to bring the cam arm into the vertical plane of either one of the arms 4 or 5 so that when the shaft 12 is turned said cam lever may be brought into contact with one of the arms to swing the same and move the shifting rod connected thereto forwardly. A cam lever 14 similar to the lever 11 is also in a like manner mounted upon the shaft 12 and connected to the lever 11 to slide longitudinally on the shaft therewith. To bring said lever 14 into the vertical plane of either one of the arms 8 or 9 which arms are formed with a curved or cam shaped end surface adapted to be engaged by a similarly formed end of the lever, the lever 11 is of such a length that it is adapted to pass freely between the arms 4 and 8 or 5 and 9 with the upper arms working freely above said lever. The levers 11 and 14 may therefore be moved freely transversely of the casing to bring either one of them into alinement with its desired operating arm, and thus these levers form a selector by means of which the desired speed change may be selected by moving the levers into alinement with the arm which when operated will move one of the shifting rods in the proper direction to effect the desired speed change. Thus when the cam lever 11 is swung into contact with the shifting arm 4, said arm will be swung forwardly and the rod 1 will be moved in the same direction, shifting the clutch members B' into engagement and giving high speed. In a like manner when said arm 11 is shifted into alinement with the arm 5 and swung into engagement therewith, said arm will be forced to swing forwardly and shift the rod 2 in that direction, effecting an operative connection of the gear C with its pinion C' to give the lowest speed. When the cam lever 14 is shifted into the plane of the arm 8 and its shaft 12 turned to bring the lever into contact with the end surface of the arm, said arm will be forced to swing upwardly thus turning the shifting arm 4 which is integral therewith in a rearward direction and moving the rod 1 to bring the gear B into mesh with the gear B2 and give an intermediate speed which is the speed next lower than that which is effected by the bringing of the clutch members B' into engagement. In a like manner when the cam lever 14 is shifted and brought into engagement with the arm 9, the shifting arm 5 will be swung rearwardly and move the rod 2 to shift the gear C into mesh with its pinion C2 to reverse the direction of motion imparted to the driven shaft.

The cam levers 11 and 14 are off-set from each other or extend in different vertical longitudinal planes so that when one of them is swung into engagement with its shifting arm the other will pass between the shifting arms and be inoperative. To move these arms along the shaft 12 and give them the desired position in selecting the particular speed desired, a yoke 15 is mounted upon a transverse shaft 16 in the casing 3 to slide freely thereon and is engaged in a groove in the hub of the cam levers 11 and 14. This yoke is moved along its shaft to move the levers, by means of a crank arm 17 having a forked lower end engaging a pin on the hub of the yoke 15 and this crank arm is pivoted in a bearing in the end of the casing and extends therethrough where it is provided with an operating lever 18 on its outer end by means of which it is turned. A suitable hand lever 19 is mounted in any convenient place upon the automobile, as upon the steering column adjacent the steering wheel, not shown, and this lever is arranged to swing over a suitable sector 20 provided with indicating marks as R, L, I, H, and N to indicate "Reverse", "Low", "Intermediate", "High" and "Neutral" speeds or positions of the transmission gearing. An arm 21 secured to the lower end of a shaft 22 which is turned by the hand lever 19 has a connecting rod 23 pivotally attached to the outer end and the opposite end of said rod is pivotally connected to the lever 18 which operates to slide the selector cam levers 11 and 14 along the shaft 12.

The shaft 12 may be turned by any suitable means such as a lever 24 secured upon one end thereof outside of the casing 3 and this lever may be connected in any suitable manner to a lever, not shown, for operating it by means of the hand or foot of the operator, but preferably to the clutch pedal in an automobile construction so that each time the clutch is disengaged the shaft 12 will be turned.

To obviate any possibility of two of the gears of the transmission being thrust into mesh while two other gears are still in engagement, means are provided whereby the first portion of the turning movement of the shaft 12 will cause the shifting arms to be swung into their intermediate position if either one of them is not already in that position and thus shift the gears of the transmission into inoperative or neutral position as shown in Fig. 1. The mechanism for thus neutralizing the gears comprises a slide 25 which is mounted upon suitable guide rods 26 and 27 adjacent to one side of the casing 3 to slide freely upon said rods longitudinally of the casing. This slide has a central opening 28 therein through which the shaft 6 extends and also for the purpose of receiving two neutralizing arms 29 and 30 mounted upon said shaft and extending rearwardly therefrom longitudinally of the opening. The arm 30 is secured to the shaft in any suitable manner as by a pin 31 and the arm 29 is formed integral with or secured to the hub of the shifting arms 5 and 9 to turn therewith freely upon the shaft 6. The rear end of the opening 28 in the slide is formed with rearwardly converging sides 32 which form inclines to engage the arms 29 and 30 and turn them to a horizontal position when the slide is moved forwardly into engagement therewith. The opening 28 is of such a length and width relative to the neutralizing arms that it will permit said arms to turn in the opening with the swinging of the shifting arms and permit of a sufficient movement to throw the gears of the transmission mechanism into mesh.

To move the slide forwardly whenever the shaft 12 is turned, an arm 33 is secured upon said shaft and carried by the slide is a dog 34 adapted to be engaged by the upper end of the arm. This dog may be adjusted to provide for wear by means of adjusting screws 35 and it is arranged to slide freely in an opening in the slide 25 so that upon the rearwardly swinging movement of the arm 33 it will be lifted thereby and permit the arm to pass. The upper end of the arm and the lower end of the dog are however, so formed that upon the forward swinging movement of the arm 33, said arm will contact the dog in such a manner as to move the slide forwardly to the limit of its movement before it swings out of engagement therewith in its forwardly and downwardly swinging movement. The parts are so proportioned that the arm 33 will disengage itself from the dog just as one of the cam levers of the selector comes into engagement with its shifting arm and thus the neutralizing slide will be moved forward to the limit of its movement and through the medium of the neutralizing arms 29 and 30 move the gears into neutral position during approximately one-half of the forward turning movement of said cam lever. The remainder of this turning movement brings the cam lever into engagement with its shifting arm and shifts the selector gear while the continuous forwardly swinging movement of the arm 33 operates through a forked or slotted lever 36 to return the slide to its original position or rear end of its movement. The forked lever 36 is pivoted at 37 to the side of the casing and has a slotted upper end engaging a pin 38 projecting from the side of the slide 25. A lug 39 on the hub of the forked lever is arranged to be engaged by a similar lug 40 on the forward side of the lever 33 and said lugs are so positioned and arranged that they come into contact with each other just as the upper end of the arm 33 moves out of engagement with the dog 34 in moving the slide forwardly, as shown in Fig. 10.

When this invention is embodied in an automobile construction and the shaft 12 is connected up with the clutch pedal as hereinbefore described, the operator desiring to shift the gears for the purpose of securing a desired speed, as for instance when the gears are in neutral position as shown in Fig. 1 and he desired to shift the gear C into mesh with the pinion C' to give first or low speed, he will first move the handle 19 to the position "L," which movement will shift the selector to bring the cam lever 11 into alinement with the shifting arm 5. Then by a forward movement of the clutch pedal which will disengage the clutch, and turns the shaft 12, he will swing the arm 33 and move the neutralizing slide 25 forwardly. When the slide reaches the forward end of its movement it will be released from said arm and return to rearward position by means of the fork 36 as previously described and the continued forward movement of the clutch pedal and turning of the shaft 12 will bring said cam lever 11 into engagement with the shifting arm 5 which will be swung forwardly thereby and shift the desired gears into mesh.

The gears now being in first or low speed position, if the operator wishes to shift to any other speed, as for instance second or intermediate speed, he will set the hand lever 19 to the position marked "I" and this will bring the cam lever 14 into alinement with the shifting arm 8. The operation of the clutch pedal will then be repeated to turn the shaft 12 and the neutralizing slide will as before, during the first part of the turning movement, be moved forwardly. The mechanism having before been operated to bring the low speed gears into mesh, the neutralizing arm 29 will lie adjacent to the lower side of the opening 28 in the slide 25 as shown in Fig. 8 and thus when said slide moves forwardly, said arm will be thrust upward to mid position and its corresponding shifting arm 5 will be simultaneously swung rearwardly and move the low speed gears into neutral position prior to the engagement of said cam lever 14 with the arm 8 which engagement will effect the shifting of the gear B into mesh with the gear B2 and give the desired speed change.

The other speed changes may be secured in a like manner. By shifting the hand lever 19 to the position marked "N" the selector cam levers are moved to a position where they are both out of alinement with any of the operating arms and thus when the clutch pedal is operated to throw out the clutch, the neutralizing slide 25 only will be operated and thus the only change effected will be to throw any gears which may be in mesh into neutral position. It will be noted that with this construction it will be impossible to shift any of the gears into engagement to give a desired speed without first moving any other gear which may be in position to transmit motion, into neutral position. It will also be noted that the turning of the shaft 12 and thus the swinging of the shifting arms to shift the gears is under the direct control at all times of the operator who may therefore shift the gears into mesh quickly or slowly as found desirable, he thus being able to eliminate the noise and wear incident to bringing the gears into contact when their teeth are not out of alinement. It will also be noted that there are no springs or loose parts to become broken or displaced in operation and that the movements are all positive and accurate. The shifting mechanism is also contained within a small casing which may be readily bolted in place upon the top of the ordinary form of transmission gearing, taking the place of the usual hand lever for shifting the gears.

Having thus fully described my invention what I claim is:—

1. In a gear shifter, the combination with gear shifting elements, of a swinging member for operating said elements pivoted intermediate its ends, and means shiftable transversely of the plane of pivotal movement of said member for selectively engaging said member at either side of its pivot to swing said member in either direction.

2. In a gear shifter, the combination with gear shifting elements, of members for operating said elements, rotative and longitudinally movable means for selectively operating said members, and separate means operated by the rotation of said selective means and simultaneously therewith for moving all of said members to shift said elements to neutral position.

3. In a gear shifter, the combination with gear shifting elements, of a plurality of members for operating said elements, and means for operating said members including selectively positioned members for operating any one of said members, and a neutralizing member operated by said means for operating all of said members prior to the operation of any one of them by said selectively positioned members.

4. In a gear shifter, the combination with a gear shifting element operable in two directions, of a pivoted operating member for moving said element, and selective means including two pivoted members connected to turn together and shiftable transversely of the plane of pivotal movement of said operating member, one for engaging said member at one side of its pivot to shift said element in one direction and one to engage said member at the outer side of its pivot and shift said element in the other direction.

5. In a gear shifter, the combination with a gear shifting element operable in two directions, of a pivotal operating member for moving said element, and members adapted to be moved transversely of the plane of rotation of the pivotal member to bring either of them into operative relation with said pivoted member to swing the same in either direction.

6. In a gear shifter, the combination with a plurality of gear shifting elements operable in two directions, of an operating member for each element pivoted intermediate its ends, and selective means adapted to be moved transversely of the plane of pivoted movement of said operating members to engage any one of said operating members at either side of their pivot to turn the same in two directions.

7. In a gear shifter, the combination with a gear shifting element operable in two directions, operating means for said element including pivoted arms connected to turn together, a selector to engage either of said arms, and means for operating said selector to engage one of the arms and turn the operating means in one direction and to engage the other arm and turn said means in the other direction.

8. In a gear shifter, the combination with a plurality of gear shifting elements, of an operating member for each element pivoted intermediate its ends, a rotatable selector movable transversely of the plane of pivoted movement of said operating members into operative position relative to either end portion of each member at each side of the pivot thereof, means for turning said selector to swing said operating members, and a neutralizing member for moving all of said operating members to shift the elements to neutral position, said neutralizing member being operated by said selector in advance of swinging said operating members.

9. In a gear shifter, the combination with a plurality of longitudinally movable gear shifting elements, of a pivoted arm for moving each of said elements, a selector having an arm movable into operative relation to any one of said arms for turning the same, and a neutralizer independent of said selector operated by the turning of said selector arm to turn said arms for moving said elements in advance of their operation by said selector.

10. In a gear shifter, the combination with a plurality of gear shifting elements movable in two directions, a pivoted member for each element to move the same, a selector movable transversely of said pivoted members into operative relation with each of said pivoted members and provided with means for engaging and turning said pivoted members in one direction, and means connected to each pivoted member to be engaged by said selector when properly positioned by a movement thereof transversely of said means for turning said pivoted members in the other direction.

11. In a gear shifter, the combination with a plurality of gear shifting elements movable in two directions, of pivoted arms for moving said elements, a selector having pairs of members one member of each pair being adapted to engage one of said arms and shifting an element in one direction and the other of said pairs of arms being adapted to engage another arm and shift said element in the other direction, and means for operating the selector.

12. In a gear shifter, the combination with a gear shifting element, of an operating member having a downwardly extending arm to shift said element and a laterally extending arm, a pivoted member having a pair of arms to selectively engage the arms of said member, and means for turning the pivoted selector.

13. In a gear shifter, the combination with a plurality of longitudinally movable gear shifting elements, a pivoted operating member for each element, and a pivoted selector for operating said members, said pivoted operating members and said pivoted selector having laterally extending portions so positioned relatively to each other that the arcs described by them in their turning movement will overlap to turn the operating members by the engagement of said portions by the corresponding portions on the selector, said selector being shiftable longitudinally of its pivotal axis.

14. In a gear shifter, the combination with a plurality of longitudinally movable gear shifting elements, a pivoted operating member for moving each element and a pivoted and longitudinally movable selector having two cam faces arranged in different vertical planes to engage the operating members and turn the same.

15. In a gear shifter, the combination with a gear shifting element, of a pivoted operating member having a contact surface above its pivotal point and a contact surface below its pivotal point and a pivoted selector having contact surfaces in different planes to engage the contact surfaces of the operating member and turn the same in two directions.

16. In a gear shifter, the combination with a plurality of gear shifting elements, of a pivoted operating member for moving each element, a selector movable into operative position with each of said operating members and a sliding neutralizer to turn all of said members to neutral position, said neutralizer being moved in timed relation to the movement of the selector in operating said members.

17. In a gear shifter, the combination with a plurality of gear shifting elements, of an operating member for moving each element in two directions, a selector movable into operative relation with each of said members, a neutralizing arm connected with each of said members and a sliding neutralizing member to engage the arms and operated by said selector.

18. In a gear shifter, the combination with a plurality of gear shifting elements, of an operating member for each element, a selector for moving the operating members adapted to be moved into operative relation with any one of said members, a sliding neutralizing member adapted to turn all of said members and shift the elements to neutral position, and means operated by the operation of the selector for positively moving the neutralizer in two directions during the operation of the selector in operating said members.

19. In a gear shifter, the combination of a casing having an open side adapted to be detachably secured over the open side of a casing of a change speed gearing, an operating member for each gear shifting element of the change speed gearing, a selector for moving the operating members adapted to be shifted into operative relation with any one of said members, a neutralizing member for moving all of said members to neutral position when the selector is operated, said operating members being extended toward the open side of said casing to engage the gear shifting elements and said operating members, selector, and neutralizer all being housed within said casing, means extending through the casing for operating the selector and neutralizer, and separate means extending outside the casing for shifting the selector to set the same to give the desired speed.

20. In a gear shifter, the combination with a plurality of gear shifting elements, a pivoted arm for moving each element, a shaft mounted adjacent said operating members, a selector slidable longitudinally of the shaft and operatively connected thereto to turn therewith, said selector being adapted to engage and operate said members when the shaft is turned, means for moving the selector to set the same in operative relation to any one of said members, a horizontally disposed neutralizing slide for moving all of said members to neutral position, and an arm on said shaft for moving said slide.

21. In a gear shifter, the combination of a plurality of gear shifting elements, a pivoted operating member for each element, a neutralizing arm connected to each member to turn therewith, a slidable neutralizing member to engage the arms and turn them to intermediate position, a pivoted selector supported adjacent said members and adapted to be moved into operative relation with any one of said members, and means operated by the turning of the selector for moving the slide in two directions during a portion of the turning movement of said selector.

In testimony whereof I affix my signature in presence of two witnesses.

GEORGE M. MILNE.

Witnesses:
 LEWIS E. FLANDERS,
 ANNA M. DORR.